United States Patent
Imoto et al.

(10) Patent No.: US 9,282,213 B2
(45) Date of Patent: Mar. 8, 2016

(54) DRIVING DEVICE, IMAGE READING APPARATUS AND IMAGE FORMING APPARATUS

(71) Applicant: Sharp Kabushiki Kaisha, Osaka-shi, Osaka (JP)

(72) Inventors: Masahiro Imoto, Osaka (JP); Yasuhiro Suto, Osaka (JP); Shohichi Fukutome, Osaka (JP); Kenji Nakanishi, Osaka (JP); Kazuhiro Iguchi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 14/608,397

(22) Filed: Jan. 29, 2015

(65) Prior Publication Data

US 2015/0229800 A1    Aug. 13, 2015

(30) Foreign Application Priority Data

Feb. 10, 2014    (JP) ................................ 2014-022999

(51) Int. Cl.
*H04N 1/10* (2006.01)
*F16H 19/06* (2006.01)
*F16H 57/00* (2012.01)
*G03G 21/16* (2006.01)

(52) U.S. Cl.
CPC .......... *H04N 1/1026* (2013.01); *F16H 19/0622* (2013.01); *F16H 57/0031* (2013.01); *G03G 21/1647* (2013.01); *F16H 2019/0686* (2013.01); *Y10T 74/18848* (2013.01)

(58) Field of Classification Search
CPC combination set(s) only.
See application file for complete search history.

(56) References Cited

U.S. PATENT DOCUMENTS

2002/0114645 A1 * 8/2002 Takahashi et al. ..... G03G 15/04 399/211
2006/0240924 A1   10/2006 Osakabe et al.

FOREIGN PATENT DOCUMENTS

JP    11-215320 A    8/1999
JP    2006-221064 A    8/2006

* cited by examiner

*Primary Examiner* — Clayton E Laballe
*Assistant Examiner* — Jas Sanghera
(74) *Attorney, Agent, or Firm* — Keating & Bennett, LLP

(57) ABSTRACT

A driving device is used in an image reading apparatus, and reciprocates a scanning unit for reading an image on an original. The driving device comprises a pull member, a driving pulley which transmits driving force to the pull member, a following pulley which applies tension to the pull member and a pulley holder having a pulley axis which holds the following pulley rotatably. Then, the pulley axis has a lock pawl capable of locking an upper end portion of the following pulley and canceling engagement with the following pulley by being tilted toward a side of an axial center by elastic deformation. Furthermore, the lock pawl is arranged at a side of a tension acting direction from the pull member to the following pulley except the farthest position from the driving pulley among positions in a circumferential direction of the pulley axis. It is possible to attach and detach the following pulley easily at a time of maintenance or the like.

10 Claims, 8 Drawing Sheets

TENSION ACTING DIRECTION

DRIVING DEVICE, IMAGE READING APPARATUS AND IMAGE FORMING APPARATUS

CROSS REFERENCE OF RELATED APPLICATION

The disclosure of Japanese Patent Application No. 2014-022999 filed on Feb. 10, 2014 is incorporated by reference.

BACKGROUND OF THE INVENTION

1. Field of the Invention

The present invention relates to a driving device, an image reading apparatus and an image forming apparatus, and more specifically, a driving device which reciprocates a scanning unit for reading an image on an original put on an original platen, an image reading apparatus and an image forming apparatus each provided with the driving device.

2. Description of Related Art

An example of an image reading apparatus which is provided with such a kind of conventional driving device is disclosed in Japanese Patent Application Laying-open No. H11-215320 [H04N 1/04, G03B 27/50] (Patent Literature 1) laid-open on Aug. 6, 1999. The driving device of Patent Literature 1 comprises a transmission timing belt (pull member) for transmitting driving force of a driving pulley to a reading unit (scanning unit) for reading image information and a tension pulley (following pulley) for applying tension to the transmission timing belt. Then, the tension pulley is supported rotatably by a tension pulley stand (pulley holder) which is fixed to a guide rail.

However, when assembling the driving device of Patent Literature 1, since the following pulley is fixed to the pulley holder with screws or the like, and the pulley holder is secured to the guide rail with screws or the like while giving tension to the pull member, a fastening work (assembling work) of the screws is troublesome. Furthermore, when the following pulley is to be exchanged, similarly, a work for removing and fastening of screws is required, and therefore, an exchanging work of the following pulley takes time and effort.

SUMMARY OF THE INVENTION

Therefore, it is a primary object of the present invention to provide a novel driving device, image reading apparatus and image forming apparatus.

It is another object of the present invention to provide a driving device, image reading apparatus and image forming apparatus, capable of attaching or detaching a following pulley easily to or from a pulley holder.

The present invention adopts the following structure in order to solve the above-mentioned problem.

A first invention is a driving device that is used in an image reading apparatus and reciprocates a scanning unit for reading an image on an original put on an original platen, comprising: a pull member that pulls the scanning unit; a driving pulley that transmits driving force to the pull member; a following pulley that the pull member is wound thereon while keeping a state where tension is applied to the pull member; and a pulley holder having a pulley axis that holds the following pulley rotatably, wherein the pulley axis has a lock pawl that can lock an upper end portion of the following pulley and cancel engagement with the following pulley by being tilted toward a side of an axial center of the pulley axis by elastic deformation, and the lock pawl is arranged at a side of a tension acting direction from the pull member to the following pulley except a farthest position from the driving pulley among positions in a circumferential direction of the pulley axis.

According to the first invention, since there is provided on the pulley axis with the lock pawl capable of locking the upper end portion of the following pulley and canceling the engagement with the following pulley by being tilted toward the side of the axial center by elastic deformation, it is possible to make the pulley holder hold the following pulley rotatably while being retained only by fitting the following pulley onto the pulley axis. Furthermore, only by pulling the following pulley out of the pulley axis while tilting the lock pawl to the side of the axial center, the following pulley can be removed from the pulley holder. That is, it is possible to attach or detach the following pulley easily to or from the pulley holder.

Furthermore, since screws and washers are not needed when attaching the following pulley to the pulley axis, it is possible to reduce the number of components and thus a manufacturing cost.

Furthermore, since the lock pawl is arranged at the side of the tension acting direction from the pull member to the following pulley except the farthest position from the driving pulley, the lock pawl is hard to be disengaged from the upper end portion of the following pulley even in a state where the tension is being applied to the pull member.

A second invention is the driving device according to the first invention, further comprising a fixing member that fixes the pulley holder within the image reading apparatus, which being arranged at the side of the tension acting direction from the pull member to the following pulley from the pulley axis.

According to the second invention, since the fixing member is arranged at the side of the tension acting direction by the pull member from the pulley axis, it becomes possible to arrange the pulley axis and the following pulley near a side plate of a housing of the image reading apparatus, and therefore, miniaturization of the image reading apparatus in a sub-scanning direction is enabled.

A third invention is the driving device according to the first invention, wherein the lock pawl is arranged at a position in the side of the tension acting direction and to a line orthogonally intersecting a line passing the axial center of the pulley axis and extending toward the tension acting direction with a center line that is a line extending from the axial center of the pulley axis toward the tension acting direction.

According to the third invention, even in a state where the tension is being applied to the pull member, the lock pawl becomes hard to be disengaged from the upper end portion of the following pulley.

A fourth invention is the driving device according to the first invention, wherein the pulley axis has one of the lock pawl that is arranged on a line extending from the axial center of the pulley axis to the tension acting direction.

According to the fourth invention, since the lock pawl is arranged at a position that is hardest to receive a load from the pull member, the lock pawl becomes hard to be disengaged from the upper end portion of the following pulley. Therefore, the pulley axis can hold the following pulley more stably.

A fifth invention is the driving device according to the fourth invention, further comprising a fixing member that fixes the pulley holder within the image reading apparatus, wherein an axial center of the driving pulley, an axial center of the following pulley (that is, the axial center of a pulley axis), a center of the lock pawl and a center of the fixing member are arranged on a straight line.

A sixth invention is the driving device according to the first invention, wherein the pulley axis has two lock pawls arranged in line symmetry with a center line that is a line passing the axial center of the pulley axis and extending toward the tension acting direction.

According to the sixth invention, since the pulley axis has the two lock pawls, it is possible to retain the following pulley more surely. Furthermore, since the two lock pawls are arranged in line symmetry, the pulley axis can rotate the following pulley with well balance.

A seventh invention is the driving device according to the first invention, wherein an upper end surface of the lock pawl is made into a flat surface expanding in a direction orthogonally intersecting the axial center of the pulley axis.

According to the seventh invention, by making the upper end surface of the lock pawl into a flat surface, it is possible to make a height size of the lock pawl low and thus attain thinning of the pulley holder.

An eighth invention is the driving device according to the first invention, wherein an inclined surface that gets down toward the axial center of the pulley axis is formed at a side of the axial center of the pulley axis in an upper end portion of the lock pawl.

According to the eighth invention, it becomes possible to largely tilt the lock pawl toward the side of the axial center of the pulley axis when attaching or detaching the following pulley, and therefore, it is possible to make an engagement amount of the lock pawl with the following pulley larger only by just that much, and accordingly, the following pulley can be retained more surely by the lock pawl.

A ninth invention is an image reading apparatus comprising the driving device according to the first invention.

According to the ninth invention, like the first invention, it is possible to easily attach or detach the following pulley to or from the pulley holder while the number of components is reducible. Furthermore, the lock pawl is hard to be disengaged from the upper end portion of the following pulley even in a state where the tension is being applied to the pull member.

A tenth invention is an image forming apparatus comprising the image reading apparatus according to the ninth invention.

According to the tenth invention, like the ninth invention, it is possible to easily attach or detach the following pulley to or from the pulley holder while the number of components is reducible. Furthermore, the lock pawl is hard to be disengaged from the upper end portion of the following pulley even in a state where the tension is being applied to the pull member.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 5 shows a pulley holder provided on the driving device of FIG. 4, wherein

FIG. 8 shows a pulley holder provided on a driving device of an image reading apparatus which is a second embodiment according to the present invention, wherein

FIG. 9 shows a pulley holder provided on a driving device of an image reading apparatus which is a third embodiment according to the present invention, wherein

DETAILED DESCRIPTION OF NON-LIMITING EXAMPLE EMBODIMENTS

First Embodiment

Figure 1:
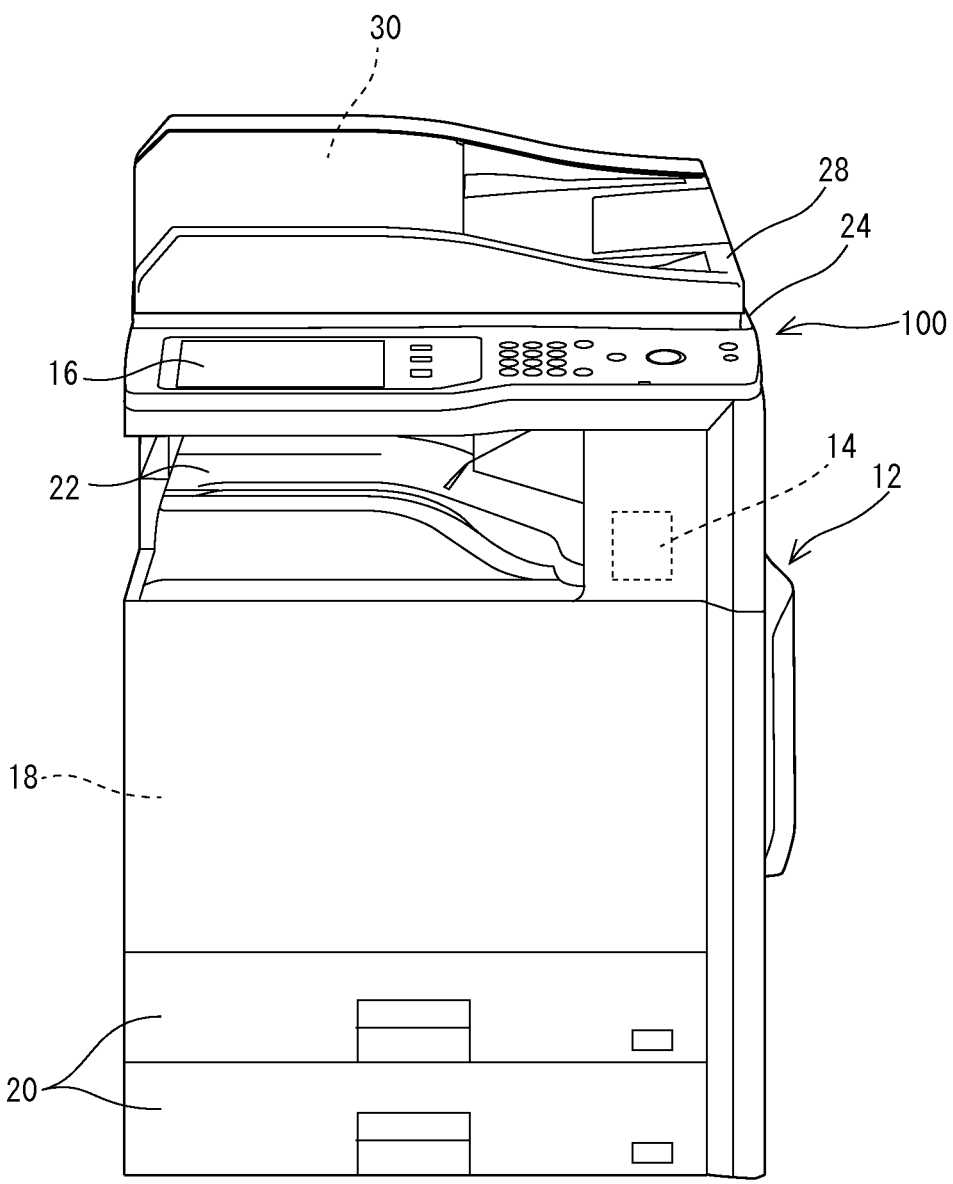
FIG. 1 is a schematic view showing an appearance of an image forming apparatus comprising an image reading apparatus which is a first embodiment according to the present invention.

In the following, an image reading apparatus 100 which is the first embodiment according to the present invention will be described. FIG. 1 is a schematic view showing an appearance of an image forming apparatus 102 which comprises the image reading apparatus 100. Furthermore, FIG. 2 is a plan view showing internal structure of the image reading apparatus 100, and FIG. 3 is a sectional view schematically showing a vertical section of the image reading apparatus 100.

Figure 2:
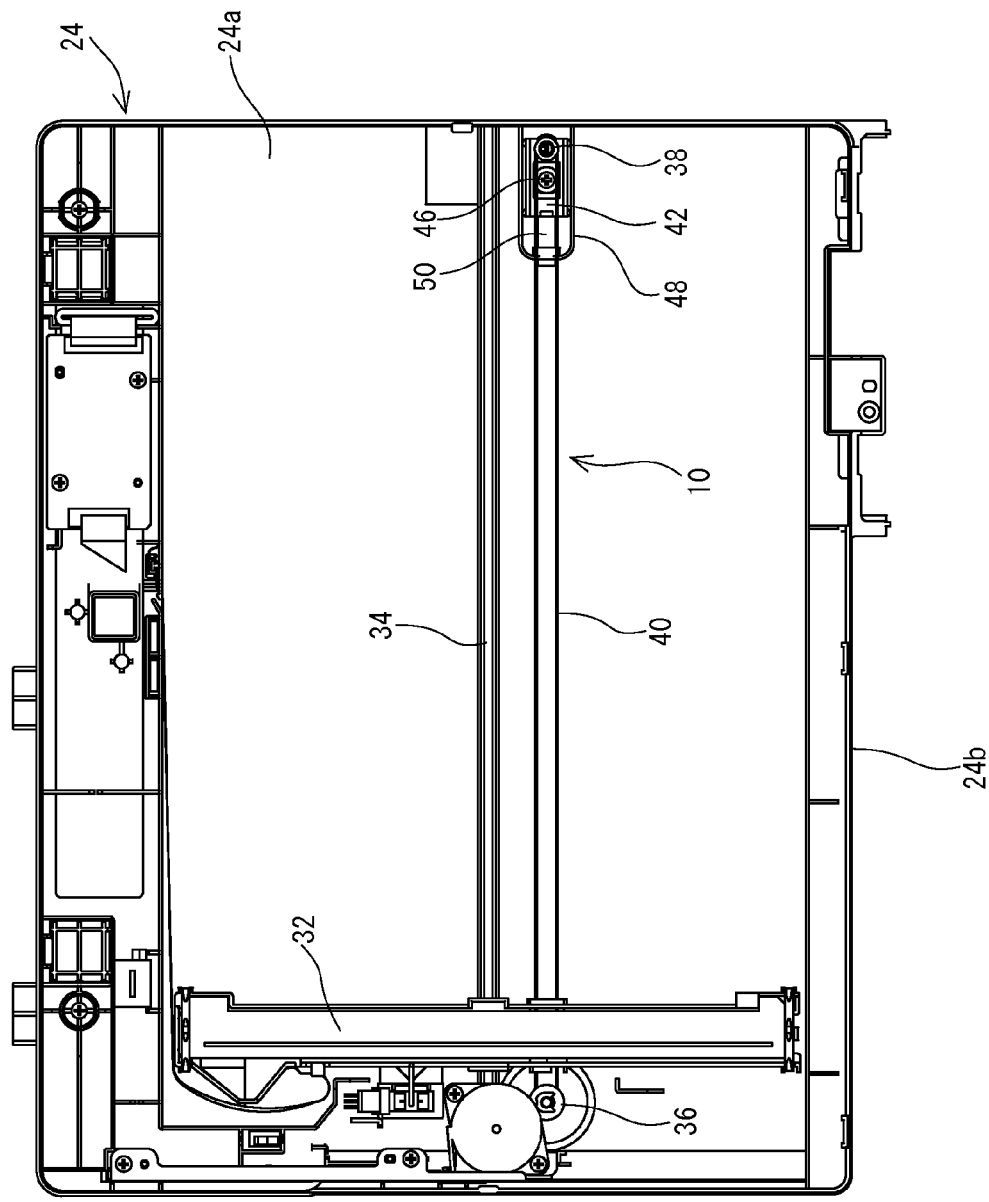
FIG. 2 is a plan view showing internal structure of the image reading apparatus of FIG. 1.
Figure 3:
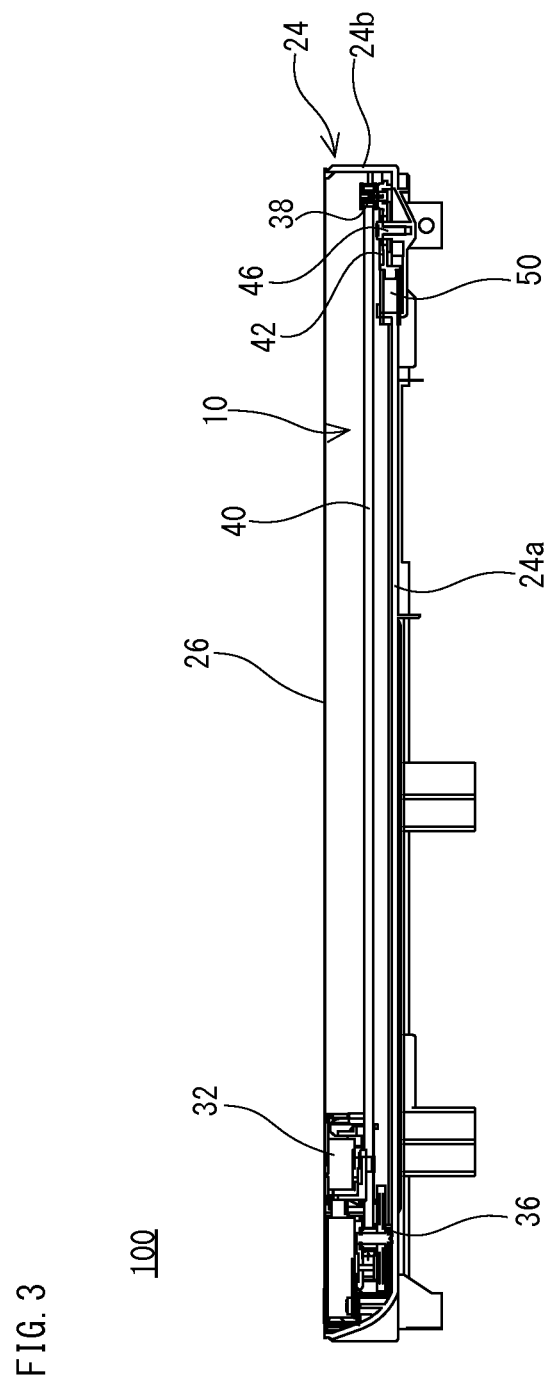
FIG. 3 is a sectional view schematically showing a vertical section of the image reading apparatus of FIG. 1.

With reference to FIG. 1-FIG. 3, the image reading apparatus 100 comprises a driving device 10 for reciprocating a scanning unit 32 in a sub-scanning direction, and is used in the image forming apparatuses 102 such as a copying machine, a facsimile, a printer, a multifunction machine compounding these, etc. In this embodiment, the image forming apparatus 102 is an MFP (Multifunction Peripheral) which has a copy function, a printer function, a scanner function, a facsimile function, etc.

First, fundamental structure of the image forming apparatus 102 will be schematically described. As shown in FIG. 1-FIG. 3, the image forming apparatus 102 comprises a main body 12 and the image reading apparatus 100 which is arranged above the main body 12, and forms a multicolor or monochromatic image onto a predetermined paper (recording paper) based on image data which is read by the image reading apparatus 100 or image data which is sent from an external computer.

A control portion 14 which controls operations of respective parts of the image forming apparatus 102 is provided at a predetermined position within the main body 12. The control portion 14 comprises a CPU, a memory, etc., and sends control signals to the respective parts of the image forming apparatus 102 according to an input operation to an operating portion 16 such as a touch panel, an operation button, etc. thereby to make the image forming apparatus 102 perform various operations.

Furthermore, an image forming portion 18 which comprises an exposure unit, a photoreceptor drum, a charger, a developing device, a fixing roller, etc. are incorporated within the main body 12. The image forming portion 18 forms an image onto the recording paper which is conveyed from a paper feed cassette 20 or the like, and discharges an image-formed recording paper on a discharge tray 22.

The image reading apparatus 100 comprises a housing 24 having a rectangular plate-like bottom plate 24a and side walls 24b which rise from its peripheral edge portion. There is provided on a top surface of the housing 24 with an original platen 26 which is formed of transparent material. Furthermore, an original platen cover 28 is attached on the original platen 26 in an openable and closeable manner via a hinge or the like. This original platen cover 28 is provided with an ADF (automatic document feeder) 30 which automatically feeds an original put on an original tray to an image reading position one by one. Furthermore, on a front side of the housing 24, there is provided with the operating portion 16 such as a touch panel, an operation button, etc. which receive an input operation by a user.

Furthermore, within the housing 24, there are provided with a CIS (Contact Image Sensor) scanning body 32 for reading an image on the original put on the original platen 26, a guide shaft 34, the driving device 10 for reciprocating the CIS scanning body 32 under the original platen 26, etc. As described later, when an image on the original put on the original platen 26 is to be read, the CIS scanning body 32 reciprocates under the original platen 26, thereby to read the image on the original to acquire image data thereof. On the other hand, when an image on the original put on an original tray is to be read, the CIS scanning body 32 is made to wait under a predetermined image reading position, and reads the image on the original when the original fed by the ADF 30 passes through the image reading position (above the CIS scanning body 32) to acquire image data.

The CIS scanning body (scanning unit) 32 is an image sensor of a so-called contact type image sensor, and comprises a light source, a rod lens array, a plurality of image sensors (photoelectric conversion elements), etc. The light source is an LED array that a plurality of LEDs are arranged, for example, and irradiates a surface of the original. The rod lens array makes a reflected light from the original focus onto the plurality of image sensors. The plurality of image sensors read pixel information focused by the rod lens array. In addition, it is possible to use a scanning unit using a CCD (Charge Coupled Device) sensor instead of the CIS scanning body 32.

The guide shaft 34 guides reciprocation of the CIS scanning body 32, which extends in a moving direction (a sub-scanning direction) of the CIS scanning body 32 on the bottom plate 24a of the housing 24. The CIS scanning body 32 is supported by this guide shaft 34 movably, and reciprocates under the original platen 26 by obtaining driving force from the driving device 10.

Subsequently, with reference to FIG. 2-FIG. 6, structure of the driving device 10 will be specifically described. As shown in FIG. 2 and FIG. 3, the driving device 10 comprises a driving pulley 36, a following pulley 38, a pull member 40, etc.

The driving pulley 36 is provided near one end portion of the guide shaft 34, and the following pulley 38 is provided near the other end portion of the guide shaft 34. An endless belt-like pull member 40 is wound on (built over) the driving pulley 36 and the following pulley 38, and the CIS scanning body 32 is connected to the pull member 40. The driving pulley 36 is rotated by a motor which is a driving source, and transmits driving force to the pull member 40. The pull member 40 is constructed by a timing belt, a wire, a chain or the like, and pulls the CIS scanning body 32 by performing circulation movement with rotation of the driving pulley 36. Accordingly, the CIS scanning body 32 is reciprocated along with the guide shaft 34. Furthermore, the following pulley 38 applies predetermined tension to the pull member 40, and rotates with the circulation movement of the pull member 40.

Figure 4:
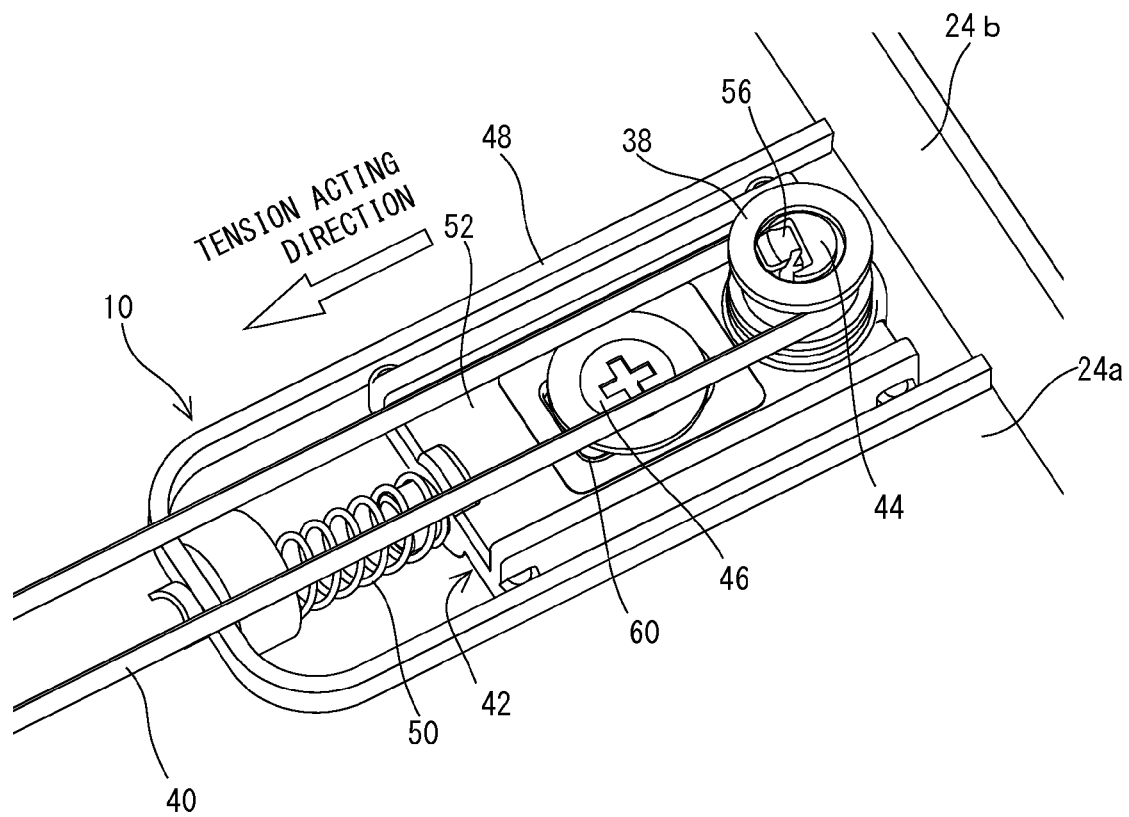
FIG. 4 is a partly enlarged perspective view showing structure of a part of a driving device provided on the image reading apparatus of FIG. 1.
Figure 5A:
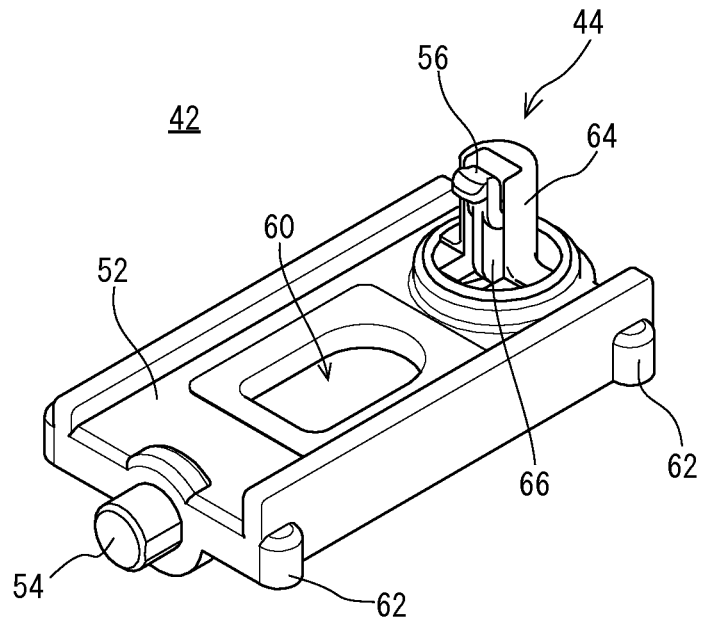
FIG. 5(a) is a perspective view of the pulley holder.
Figure 5B:
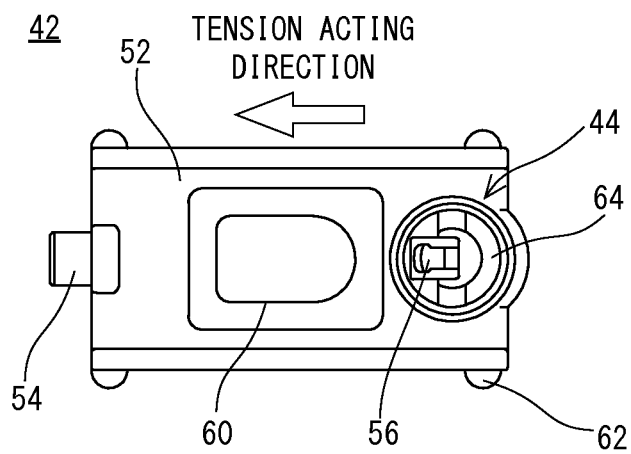
FIG. 5(b) is a plan view of the pulley holder.
Figure 5C:
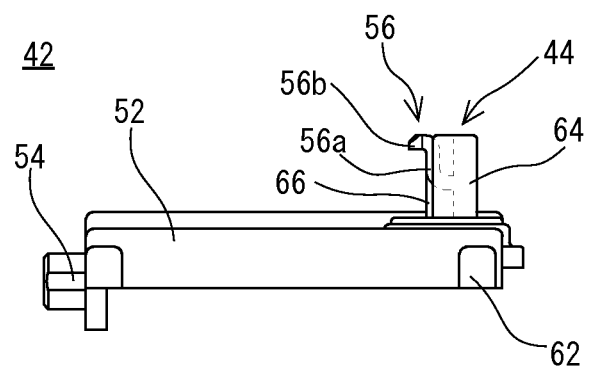
FIG. 5(c) is a side view that the pulley holder is viewed from a front side.
Figure 6:
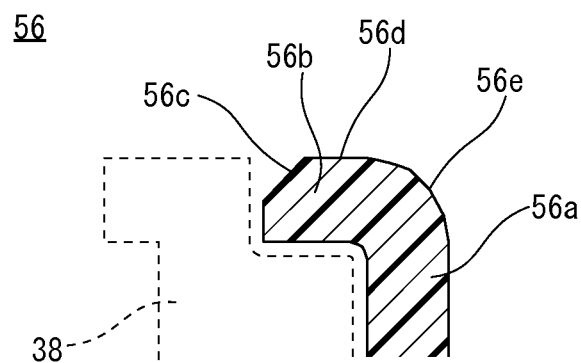
FIG. 6 is a schematic view enlarging and showing a tip end portion of a lock pawl provided on the pulley holder of FIG. 5.
Figure 7:
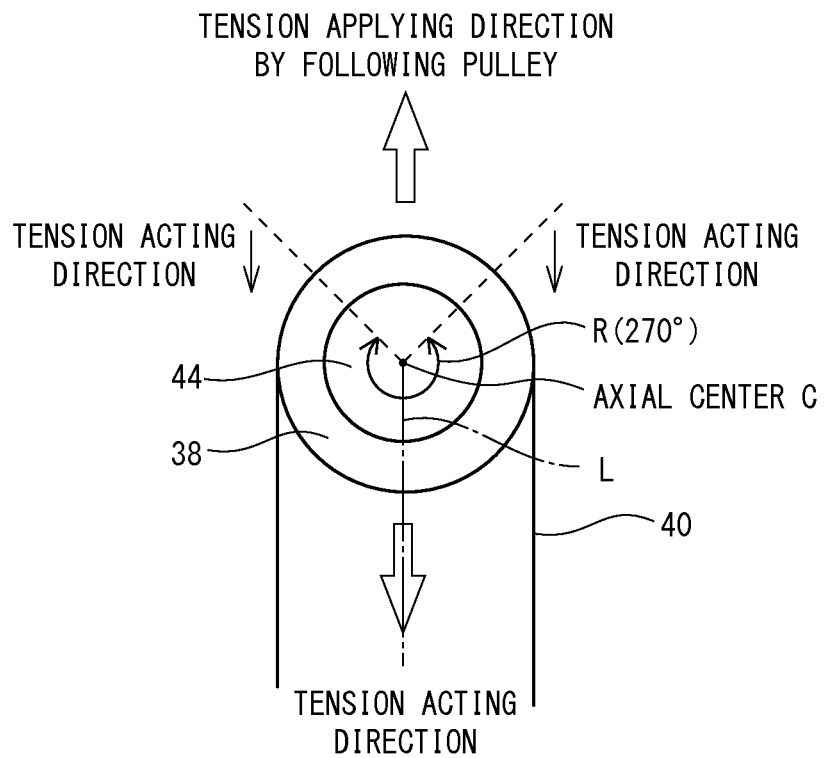
FIG. 7 is a schematic view showing an arrangement position of the lock pawl on a pulley axis.

In the following, support structure of the following pulley 38 will be described. FIG. 4 is a partly enlarged perspective view showing structure of a part of the driving device 10 (peripheral part of the following pulley 38) which is provided on the image reading apparatus 100. FIG. 5 shows a pulley holder 42 which is provided on the driving device 10, wherein FIG. 5(a) is a perspective view of the pulley holder 42, FIG. 5(b) is a plan view of the pulley holder 42, and FIG. 5(c) is a side view that the pulley holder 42 is viewed from the front side. FIG. 6 is a partly sectional view enlarging and showing a tip end portion of a lock pawl 56 which is provided on the pulley holder 42. FIG. 7 is a schematic view showing an arrangement position of the lock pawl 56 on a pulley axis 44.

As shown in FIG. 4, the following pulley 38 is attached to the bottom plate 24a of the housing 24 using the pulley holder 42. Specifically, the pulley holder 42 is attached to the bottom plate 24a by a fixing member 46 such as washers and step screws in a state where the following pulley 38 is rotatably supported by the pulley axis 44 which is formed on the pulley holder 42. In addition, the pulley holder 42 is made slidable in the sub-scanning direction by being fitted into a guide portion 48 which projects from the bottom plate 24a in an approximately U-letter shape. Furthermore, a tension applying member 50 which is an elastic member such as a spring is provided in an end portion at a side of the driving pulley 36 of the pulley holder 42. The pulley holder 42 is pushed and energized by this tension applying member 50 in a direction that tension is applied to the pull member 40, i.e., a direction that the following pulley 38 is separated from the driving pulley 36 along with the guide shaft 34.

Subsequently, specific structure of the pulley holder 42 will be described. As shown in FIG. 5, the pulley holder 42 includes a holder main body 52, a spring mounting portion 54, a pulley axis 44 having the lock pawl 56, etc., and these are integrally molded by a synthetic resin or the like.

The holder main body 52 is formed in a shape of a rectangular plate, and the spring mounting portion 54 having a short cylinder shape is formed on an end surface at a side of the driving pulley 36 (that is, a side of a direction that the following pulley 38 is pulled by the pull member 40). In addition, in this first embodiment, the side of the direction that the following pulley 38 is pulled by the pull member 40 is called a side of a tension acting direction from the pull member 40 to the following pulley 38. The above-mentioned tension applying member 50 is attached to the spring mounting portion 54. Furthermore, the pulley axis 44 is formed an end of the holder main body 52 opposite to the spring mounting portion 54 to be projected upward. Specific structure of the pulley axis 44 will be described later.

Furthermore, a long hole 60 is formed in a central portion of the holder main body 52 so as to make the pulley holder 42 adjustable in its position in the sub-scanning direction. Then, the above-mentioned fixing member 46 is fixed to the bottom plate 24a through this long hole 60. That is, the fixing member 46 for attaching the pulley holder 42 within the housing 24 of the image reading apparatus 100 is arranged at a side of the driving pulley 36 (a side of the tension acting direction from the pull member 40 to the following pulley 38) from the pulley axis 44 which supports the following pulley 38. Specifically, in this embodiment, the fixing member 46 is arranged on a line L extending from an axial center C of the pulley axis 44 in the tension acting direction by the pull member 40 (the axial center C and the line L are in FIG. 7). By thus arranging the fixing member 46 at the side of the tension acting direction by the pull member 40 from the pulley axis 44, the pulley axis 44 and the following pulley 38 can be arranged near the side plate 24b of the housing 24, and therefore, the miniaturization in the sub-scanning direction of the image reading apparatus 100 can be achieved.

Furthermore, projections 62 each having an approximately hemisphere shape in cross-section are formed on both side surfaces of the holder main body 52 (both end surfaces in a direction orthogonally intersecting the tension acting direction by the pull member 40). Since tip end portions of these projections 62 are brought into contact with the above-mentioned guide portion 48, a contacting area between the holder main body 52 and the guide portion 48 becomes small, and therefore, frictional force between the holder main body 52 and the guide portion 48 can be reduced. Therefore, the pulley holder 42 becomes slidable smoothly within the guide portion 48.

Next, specific structure of the pulley axis 44 will be described. As shown in FIG. 5, the pulley axis 44 is a spindle which supports the following pulley 38 rotatably, and comprises a shaft main body 64 which is formed in an approximately cylindrical shape. An outer diameter of the shaft main body 64 is approximately the same as an inner diameter of the following pulley 38, and the following pulley 38 rotates in a manner that an inner side surface of the following pulley 38 is slid on an outer side surface of the shaft main body 64. Furthermore, a part in a circumferential direction of the shaft main body 64 is notched, and the lock pawl 56 for locking an upper end portion of the following pulley 38 is formed in such a notched portion. In this first embodiment, a single lock pawl 56 is arranged at a side of the tension acting direction from the pull member 40 to the following pulley 38 among circumferential positions of the pulley axis 44. Specifically, the lock pawl 56 is arranged at a position nearest to the driving pulley 36 on a line passing an axial center C of the pulley axis 44 and extending in the tension acting direction by the pull member 40. That is, in this embodiment, the axial center of the driving pulley 36, the axial center of the following pulley 38 (that is, the axial center C of the pulley axis 44), the center of the lock pawl 56 and the center of the fixing member 46 are arranged on a straight line (see FIG. 2).

The lock pawl 56 includes a tiltable piece 56a which projects outwardly from an inner surface of the shaft main body 64 and stands upwardly and a locking piece 56b which extends outwardly from a tip end portion of the tiltable piece 56a. When the upper end portion of the following pulley 38 is locked by this locking piece 56b, the following pulley 38 which is held rotatably by the pulley axis 44 can be retained (see FIG. 4 and FIG. 6). Furthermore, a width size in a radial direction of the pulley axis 44 of the tiltable piece 56a is formed to be smaller than a width size in a circumferential direction of the pulley axis 44. That is, the tiltable piece 56a (lock pawl 56) is formed in a shape that is hard to tilt to a side of the circumferential direction of the pulley axis 44, but easy to tilt toward a side of the axial center C of the pulley axis 44. The lock pawl 56 can cancel engagement with the following pulley 38 by tiling toward the side of the axial center C of the pulley axis 44 by elastic deformation. Furthermore, a plate-like reinforcement portion 66 is integrally formed on a lower end portion of the lock pawl 56.

Furthermore, as shown well in FIG. 6, a straight line-like inclined surface 56c which gets down outwardly is formed at an outer side in the upper end portion (an upper surface of the tip end portion) of the lock pawl 56. By forming the inclined surface 56c, in attaching the following pulley 38 to the pulley axis 44, the lock pawl 56 becomes to naturally tilt toward the side of the axial center C of the pulley axis 44 because the lower end portion of the pulley axis 44 abuts on the inclined surface 56c. Therefore, attachment of the following pulley 38 becomes easy.

Furthermore, the upper end surface of the lock pawl 56 is made into a flat surface 56d which expands in a direction orthogonally intersecting the axial center C of the pulley axis 44. By making the upper end surface of the lock pawl 56 into the flat surface 56d, it is possible to make a height size of the lock pawl 56 low and thus attain thinning of the pulley holder 42.

Furthermore, a circular arc-like (rounded shape) inclined surface 56e which gets down toward the axial center C of the pulley axis 44 is formed at a side of the axial center C in the upper end portion of the lock pawl 56. By forming the inclined surface 56e, in attaching or detaching the following pulley 38, it is possible to largely tilt the lock pawl 56 toward the side of the axial center C of the pulley axis 44. That is, although the upper end portion largely falls down because the upper end portion of the lock pawl 56 is tilted with a fulcrum in its lower end portion, by forming the inclined surface 56e at a side of the shape center C in the upper end portion of the lock pawl 56, that is, by not forming an edge portion, the lock pawl 56 becomes hard to interfere with the shaft main body 64 if the lock pawl 56 is largely tilted. If the lock pawl 56 is largely tilted toward the side of the axial center C of the pulley axis 44, it is possible to make an engagement amount (engagement length) of the lock pawl 56 to the following pulley 38 larger only by just that much, and therefore, it becomes possible to retain the following pulley 38 more surely by the lock pawl 56. An advantage according to formation of the inclined surface 56e is especially demonstrated remarkably in a case where a plurality of lock pawls 56 are formed on the pulley axis 44 like a third embodiment describe later. This is because it is possible to prevent each of the lock pawls 56 from interfering with each other even if tilting.

In addition, in the first embodiment, the inclined surface 56c is made into a straight line-like inclined surface, and the inclined surface 56e is made into a circular arc-like inclined surface. However, the inclined surface 56c may be made into a circular arc-like inclined surface, and the inclined surface 56e may be made into a straight line-like inclined surface.

Here, it is preferable that an arrangement position of the lock pawl 56 in a circumferential direction of the pulley axis 44 is at a side of a direction that the following pulley 38 is pulled by the pull member 40, i.e., a side of a tension acting direction (see FIG. 7) except a farthest position from the driving pulley 36. This is because there is a possibility that the lock pawl 56 may be disengaged due to a load from the pull member 40 if the lock pawl 56 is arranged at a side opposite to the side of the tension acting direction from the pull member 40 to the following pulley 38. That is, the following pulley 38 is pulled by the pull member 40 in a state where the tension is applied to the pull member 40. If the lock pawl 56 is arranged at a side opposite to the side of the tension acting direction from the pull member 40 to the following pulley 38, the lock pawl 56 is bent toward a side of the axial center C of the pulley axis 44 due to the load from the pull member 40 because the lock pawl 56 is formed to be tiltable (easy to bend) toward the side of the axial center C of the pulley axis 44. If this bend becomes large, the following pulley 38 becomes in a condition to run onto a tip end of the lock pawl 56, and therefore, the engagement of the following pulley 38 by the lock pawl 56 comes to be disengaged. Accordingly, since the following pulley 38 becomes to rotate in a state where the tip end of the lock pawl 56 and the following pulley 38 are brought into contact with each other, a rotation load of the following pulley 38 becomes large. In addition to this, there is also a possibility of leading to breakage of the pulley axis 44 and the following pulley 38. Therefore, it is preferable that the lock pawl 56 is arranged at the side of the tension acting direction from the pull member 40 to the following pulley 38 except the farthest position from the driving pulley 36 as mentioned above.

In addition, as shown in FIG. 7, in the present invention, it is possible to say that the side of the tension acting direction indicating an arrangement position of the lock pawl 56 is a range except a direction that the following pulley 38 applies the tension to the pull member 40 (a tension applying direction by the following pulley 38). Within such a range, preferably, the lock pawl 56 is arranged in a range R of 270 degrees with a center line (center) that is a line L extending toward the tension acting direction from the axial center C of the pulley axis 44 among circumferential positions of the pulley axis 44, that is, in a range R of 270 degrees between two lines each having an angle of 135 degrees in a clockwise rotation and a counterclockwise rotation against the line L extending toward the tension acting direction from the axial center C at the side of the tension acting direction (side of the driving pulley 36). More preferably, the lock pawl 56 is arranged at a position (range) defined by a line orthogonally intersecting a line passing the axial center C of the pulley axis 44 and extending toward the tension acting direction with a center line that is the line L extending from the axial center C of the pulley axis 44 toward the tension acting direction at the side of the tension acting direction (side of the driving pulley 36). Most preferably, the lock pawl 56 is arranged at a position that is hardest to receive the load from the pull member 40, and specifically, at a position on the line L extending from the axial center C of the pulley axis 44 toward the tension acting direction by the pull member 40, that is, a position nearest the driving pulley 36 as shown in FIG. 5.

In the pulley holder 42 having the pulley axis 44 of such structure, only by fitting the following pulley 38 onto the pulley axis 44 as the following pulley 38 is pushed from the top, the following pulley 38 can be attached to the pulley axis 44. In a state where the following pulley 38 is attached to the pulley axis 44, i.e., at a time of use, since the upper end portion of the following pulley 38 is locked by the locking piece 56*b* of the lock pawl 56, the following pulley 38 can be surely retained. Furthermore, at a time of exchange or maintenance of the pull member 40, the following pulley 38, etc., the following pulley 38 can be detached from the pulley axis 44 only by pulling out the following pulley 38 while tilting the lock pawl 56 toward the side of the axial center C by elastic deformation.

According to this first embodiment, the lock pawl 56 which can lock the upper end portion of the following pulley 38 and cancel the engagement with the following pulley 38 by tilting toward the side of the axial center C by elastic deformation is provided on the pulley axis 44 which is provided on the pulley holder 42. Therefore, only by fitting the following pulley 38 onto the pulley axis 44, it is possible to hold the following pulley 38 on the pulley holder 42 (pulley axis 44) in a state where the following pulley 38 can be rotated and retained. That is, an attachment work of the following pulley 38 to the pulley holder 42 becomes easy. Furthermore, since what is necessary is just to pull out the following pulley 38 from the pulley axis 44 while the lock pawl 56 is tilted toward the side of the axial center C when removing the following pulley 38, a removal work of the following pulley 38 also becomes easy. That is, according to the first embodiment, it is possible to attach and detach the following pulley 38 easily to or from the pulley holder 42.

Furthermore, according to the first embodiment, since attachment members such as screws and washers are not needed when attaching the following pulley 38 to the pulley axis 44, it is possible to reduce the number of components and thus a manufacturing cost.

Furthermore, according to the first embodiment, since the lock pawl 56 is arranged at the side of the tension acting direction from the pull member 40 to the following pulley 38 except the farthest position from the driving pulley 36, even in a state where the tension is applied to the pull member 40, the lock pawl 56 is hard to be disengaged from the upper end portion of the following pulley 38. In particular, in this first embodiment, since the lock pawl 56 is arranged at a position nearest to the driving pulley 36, which is hardest to receive a load from the pull member 40, the pulley axis 44 can hold the following pulley 38 more stably.

Second Embodiment

Figure 8A:
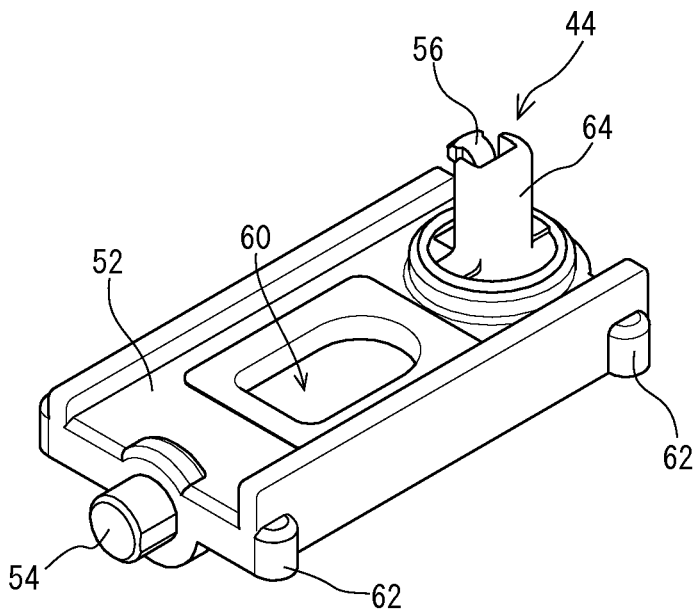
FIG. 8(a) is a perspective view of the pulley holder.
Figure 8B:
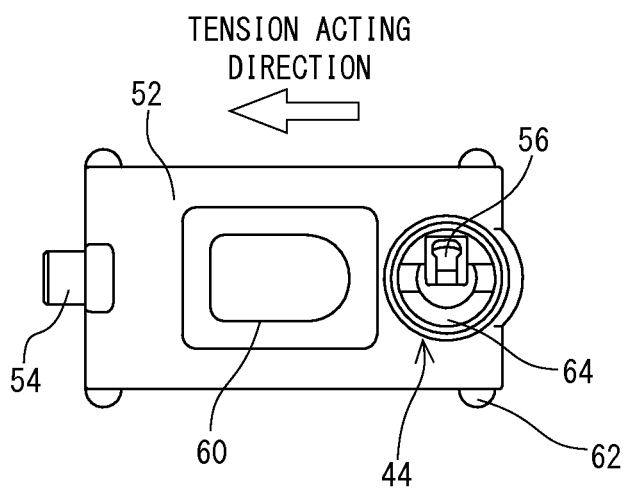
FIG. 8(b) is a plan view of the pulley holder.
Figure 8C:
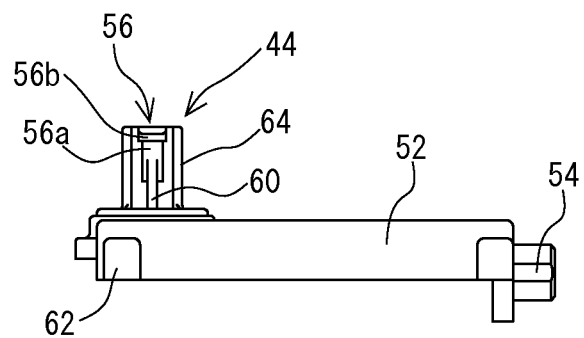
FIG. 8(c) is a side view that the pulley holder is viewed from a rear side.

Next, with reference to FIG. 8, an image reading apparatus 100 which is the second embodiment of according to the present invention. In this second embodiment, an arrangement position of the lock pawl 56 differs from those of the above-mentioned first embodiment. Since structure of other portions is not changed, by applying the same reference numerals to portions which are common in the above-mentioned first embodiment, a duplicate description is omitted or simplified. Then, in the following, only the structure of a pulley holder 42 which is provided on the driving device 10 of the image reading apparatus 100 of this second embodiment will be described. FIG. 8 shows a pulley holder 42 which is provided on the driving device 10 of an image reading apparatus 100, wherein FIG. 8(*a*) is a perspective view of the pulley holder 42, FIG. 8(*b*) is a plan view of the pulley holder 42, and FIG. 8(*c*) is a side view that the pulley holder 42 is viewed from a rear side.

As shown in FIG. 8, the pulley holder 42 includes the holder main body 52, the spring mounting portion 54, the pulley axis 44 having the lock pawl 56, etc., and these are integrally molded by a synthetic resin or the like. The lock pawl 56 includes the tiltable piece 56*a* and the locking piece 56*b*, a width size of the tiltable piece 56*a* in a radial direction of the pulley axis 44 is formed smaller than a width size in a circumferential direction of the pulley axis 44.

Then, in the second embodiment, the lock pawl 56 is arranged on a line orthogonally intersecting a line passing the axial center C of the pulley axis 44 and extending in the tension acting direction among circumferential positions of the pulley axis 44. If the lock pawl 56 is arranged at such a position, since a load from the pull member 40 is mainly applied to the shaft main body 64 in a state where the tension is applied to the pull member 40, the load that is applied to the lock pawl 56 becomes small. Furthermore, since the lock pawl 56 is formed in a shape that is hard to be tilted to a side of the circumferential direction of the pulley axis 44, even if the lock pawl 56 receives a load from the pull member 40, the lock pawl 56 is hard to be bent in the tension acting direction. Therefore, the lock pawl 56 is hard to be disengaged from the upper end portion of the following pulley 38, and the pulley axis 44 can hold the following pulley 38 stably.

According to this second embodiment, since the pulley axis 44 has the lock pawl 56, like the above-mentioned first embodiment, it is possible to easily attach and detach the following pulley 38 to or from the pulley holder 42.

Furthermore, according to the second embodiment, since the lock pawl 56 is arranged at the side of the tension acting direction from the pull member 40 to the following pulley 38 except the farthest position from the driving pulley 36, the lock pawl 56 is hard to be disengaged from the upper end portion of the following pulley 38 even in a state where the tension is applied to the pull member 40.

In addition, in the second embodiment, although the lock pawl 56 is arranged to a rear side in FIG. 8, of course, the lock pawl 56 may be arranged an opposite side, i.e., a front side.

Third Embodiment

Figure 9A:
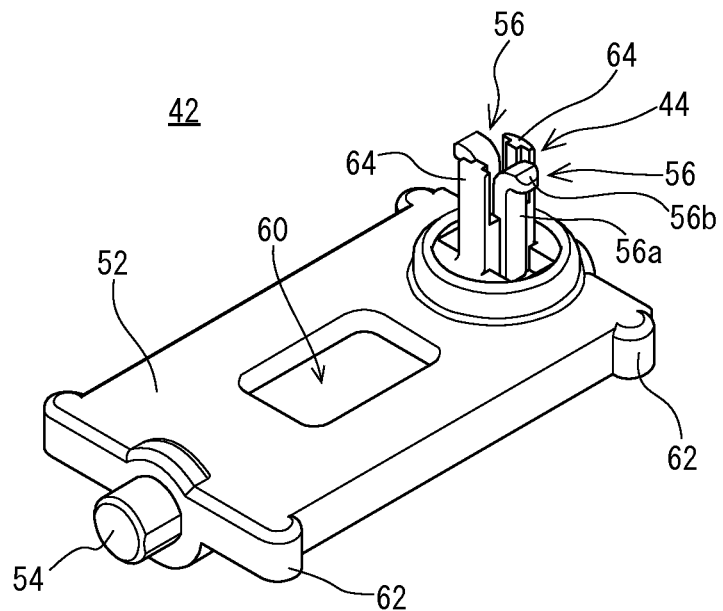
FIG. 9(a) is a perspective view of the pulley holder.
Figure 9B:
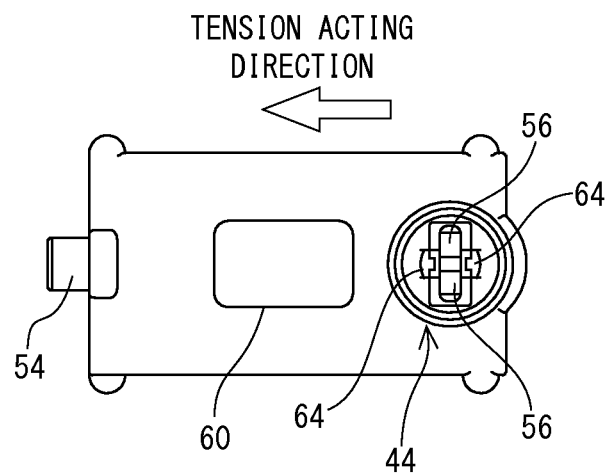
FIG. 9(b) is a plan view of the pulley holder.
Figure 9C:
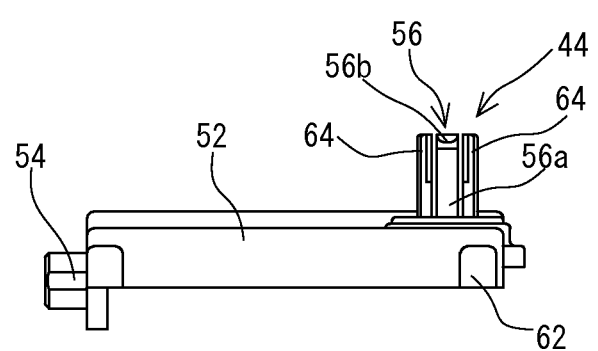
FIG. 9(c) is a side view that the pulley holder is viewed from a front side.

Subsequently, with reference to FIG. 9, an image reading apparatus 100 which is the third embodiment according to the present invention. This third embodiment is different from the above-mentioned first and second embodiments in a point which two lock pawls 56 are formed on the pulley axis 44. Since structure of other portions is not changed, by applying the same reference numerals to portions which are common in the above-mentioned first and second embodiments, a duplicate description is omitted or simplified. Then, in the following, only structure of a pulley holder 42 which is provided on the driving device 10 of the image reading apparatus 100 of this third embodiment. FIG. 9 shows the pulley holder 42 which is provided on the driving device 10 of the image reading apparatus 100, wherein FIG. 9(a) is a perspective view of the pulley holder 42, FIG. 9(b) is a plan view of the pulley holder 42, and FIG. 9(c) is a side view that the pulley holder 42 is viewed from a front side.

As shown in FIG. 9, the pulley holder 42 includes the holder main body 52, the spring mounting portion 54, the pulley axis 44 having the lock pawls 56, etc., and these are integrally molded by a synthetic resin or the like.

The pulley axis 44 comprises the shaft main body 64 which is formed in a shape of an approximately cylinder-like. The shaft main body 64 is notched in two places on a line orthogonally intersecting a line passing the axial center C of the pulley axis 44 and extending in the tension acting direction, and the lock pawl 56 is formed in each of notched portions. That is, in this third embodiment, the pulley axis 44 has the two lock pawls 56, and the two lock pawls 56 are arranged in line symmetry with a center line that is a line passing the axial center C of the pulley axis 44 and extending in the tension acting direction.

The lock pawl 56 includes the tiltable piece 56a which is a rectangular plate-like and protrudes upward from the holder main body 52 and a locking piece 56b extending outwardly from the tip end portion of the tiltable piece 56a. Then, a width size of the tiltable piece 56a in a radial direction of the pulley axis 44 is formed smaller than a width size in a circumferential direction of the pulley axis 44. Furthermore, a circular arc-like inclined surface 56e which gets down toward the axial center C of the pulley axis 44 is formed at a side of the axial center C in the upper end portion of the lock pawl 56 (see FIG. 6). In a case of the two lock pawls 56, at a time of attaching or detaching the following pulley 38, each of the two lock pawls 56 is tilted toward the side of the axial center C, but because the inclined surface 56e is formed at the side of the axial center C in the upper end portion of the lock pawl 56, the lock pawls 56 become hard to interfere with each other.

According to this third embodiment, since the pulley axis 44 has the lock pawls 56, like the above-mentioned first embodiment, it is possible to easily attach and detach the following pulley 38 to or from the pulley holder 42.

Furthermore, according to the third embodiment, since the lock pawls 56 are arranged at a side of the tension acting direction from the pull member 40 to the following pulley 38 except the farthest position from the driving pulley 36, the lock pawls 56 are hard to be disengaged from the upper end portion of the following pulley 38 even in a state where the tension is applied to the pull member 40.

Furthermore, according to the third embodiment, since the pulley axis 44 has the two lock pawls 56, it is possible to retain the following pulley 38 more surely.

Furthermore, since the two lock pawls 56 are arranged in line symmetry with a center line that is a line passing the axial center C of the pulley axis 44 and extending in the tension acting direction, the pulley axis 44 can rotate the following pulley 38 with well balance.

In addition, a specific shape of the lock pawl 56 is not limited to the shape as shown in the first to third embodiments, and a proper shape is employable if it is a shape capable of locking the upper end portion of the following pulley 38 and capable of canceling the engagement with the following pulley 38 by being tilted toward the side of the axial center C by elastic deformation.

Furthermore, in each of the above-mentioned first to third embodiments, although the driving device 10 is applied to the image forming apparatus (multifunction machine) 102 that the image reading apparatus 100 and the main body 12 comprising the image forming portion 18 are integrated, not limited to this. For example, the image reading apparatus 100 comprising the driving device 10 may be an individual product. That is, the driving device 10 may be applied to the image reading apparatus 100 which has only a scanner function. In this case, the image reading apparatus 100 is connected to a network and transmits a read image to a personal computer, other image forming apparatuses, etc., for example.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A driving device that is used in an image reading apparatus and reciprocates a scanning unit for reading an image on an original put on an original platen, comprising:
   a pull member that pulls the scanning unit;
   a driving pulley that transmits driving force to the pull member;
   a following pulley that the pull member is wound thereon while keeping a state where tension is applied to the pull member; and
   a pulley holder having a pulley axis that holds the following pulley rotatably,
   wherein the pulley axis has a lock pawl that can lock an upper end portion of the following pulley and cancel engagement with the following pulley by being tilted toward a side of an axial center of the pulley axis by elastic deformation, and
   the lock pawl is arranged at a side of a tension acting direction from the pull member to the following pulley except a farthest position from the driving pulley among positions in a circumferential direction of the pulley axis.

2. The driving device according to claim 1, further comprising a fixing member that fixes the pulley holder within the image reading apparatus, which being arranged at the side of the tension acting direction from the pull member to the following pulley from the pulley axis.

3. The driving device according to claim 1, wherein the lock pawl is arranged at a position in the side of the tension acting direction and to a line orthogonally intersecting a line passing the axial center of the pulley axis and extending toward the tension acting direction with a center line that is a line extending from the axial center of the pulley axis toward the tension acting direction.

4. The driving device according to claim 1, wherein the pulley axis has one of the lock pawl that is arranged on a line extending from the axial center of the pulley axis to the tension acting direction.

5. The driving device according to claim 4, further comprising a fixing member that fixes the pulley holder within the image reading apparatus, wherein an axial center of the driving pulley, an axial center of the following pulley, a center of the lock pawl and a center of the fixing member are arranged on a straight line.

6. The driving device according to claim 1, wherein the pulley axis has two lock pawls arranged in line symmetry with a center line that is a line passing the axial center of the pulley axis and extending toward the tension acting direction.

7. The driving device according to claim 1, wherein an upper end surface of the lock pawl is made into a flat surface expanding in a direction orthogonally intersecting the axial center of the pulley axis.

8. The driving device according to claim 1, wherein an inclined surface that gets down toward the axial center of the pulley axis is formed at a side of the axial center of the pulley axis in an upper end portion of the lock pawl.

9. An image reading apparatus comprising the driving device according to claim 1.

10. An image forming apparatus comprising the image reading apparatus according to claim 9.

* * * * *